(12) United States Patent
Silverbrook et al.

(10) Patent No.: US 6,712,452 B1
(45) Date of Patent: Mar. 30, 2004

(54) MODULAR COMPACT PRINTER SYSTEM

(75) Inventors: Kia Silverbrook, Balmain (AU); Simon Robert Walmsley, Epping (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/575,173

(22) Filed: May 23, 2000

(30) Foreign Application Priority Data

May 25, 1999 (AU) .............................................. PQ0560

(51) Int. Cl.⁷ .................................................. B41J 2/01
(52) U.S. Cl. ...................................................... 347/50
(58) Field of Search ............................. 347/50, 49, 13, 347/42; 358/296; 396/310, 311

(56) References Cited

U.S. PATENT DOCUMENTS

| | | | |
|---|---|---|---|
| 4,827,347 A | * | 5/1989 | Bell ...................... 348/333.05 |
| 4,937,676 A | | 6/1990 | Finelli et al. |
| 5,493,409 A | | 2/1996 | Maeda et al. |
| 6,217,165 B1 | * | 4/2001 | Silverbrook ................. 347/86 |
| 6,238,043 B1 | * | 5/2001 | Silverbrook ................. 347/86 |
| 6,416,160 B1 | * | 7/2002 | Silverbrook ................. 347/32 |

FOREIGN PATENT DOCUMENTS

WO  2000/71358  * 11/2000

* cited by examiner

Primary Examiner—Michael Nghiem (57) ABSTRACT

A compact printer system includes at least a printer module and at least one of a range of further modules, which are connectable together to form a rod-shaped printer system. Each module has a connection device at one or both ends for interconnection of the modules, the connection device including a physical connection device including a plug on a male connection device and a socket on a corresponding female connection device and logical connection device including a universal serial bus having four conductive strips that carry power and data between modules.

10 Claims, 11 Drawing Sheets

MODULAR COMPACT PRINTER SYSTEM

FIELD OF THE INVENTION

The invention relates to a compact printer system able to print full-color, business card size documents from a device about the size of a pen. The system includes various hot-connectable modules that provide a range of functions. In particular the invention relates to a serial bus that facilitates physical and logical connection between modules.

Reference may be had to co-pending applications claiming priority from Australian Provisional Patent Application number PQ0560 dated May 25, 1999. The co-pending applications describe related modules and methods for implementing the compact printer system. The co-pending applications are as follows:

| USSN | Docket No. | Title |
| --- | --- | --- |
| 09/575,182 | PP01 | Compact Color Printer Module |
| 09/575,194 | PP03 | Nozzle Capping Mechanism |
| 09/575,136 | PP04 | Ink Cartridge for Compact Printer System |
| 09/575,119 | PP07 | Controller for Printer Module |
| 09/575,135 | PP08 | Camera Module for Compact Printer System |
| 09/575,157 | PP09 | Image Processor for Camera Module |
| 09/575,166 | PP10 | Memory Module for Compact Printer System |
| 09/575,134 | PP11 | Effects Module for Compact Printer System |
| 09/575,121 | PP12 | Effects Processor for Effects Module |
| 09/575,137 | PP13 | Timer Module for Compact Printer System |
| 09/575,167 | PP15 | Color Conversion Method for Compact Printer System |
| 09/575,120 | PP16 | Method and Apparatus of Dithering |
| 09/575,122 | PP17 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| USSN | Docket No. | Title |
| --- | --- | --- |
| 09/575,152 | MJ62 | Fluidic seal for an ink jet nozzle assembly |
| 09/575,141 | IJ52 | Ink jet printhead having a moving nozzle with an externally arranged actuator |
| 09/575,125 | IJM52 | Method of manufacture of an ink jet printhead having a moving nozzle with an externally arranged actuator |
| 09/575,176 | MJ63 | Ink jet printhead nozzle array |
| 09/575,147 | MJ58 | Nozzle guard for an ink jet printhead |

Having a number of physical slots and connectors on a device such as a digital camera has an effect on the size, the cost, and the functionality of the device. The more physical connectivity standards a camera has to support the more the physical number of connectors the camera must have. To be fully modular a compact printer system must have common connectivity between modules and a serial bus to support the connectivity.

SUMMARY OF THE INVENTION

In one form, the invention resides in a compact printer system comprising:

a printer module having a fall-width stationary printhead for printing a stored image on printable media in a single pass and having at least one first connection means;

at least one further module, each having at least one second connection means connectable to said printer module;

said first and second connection means including physical connection means and logical connection means providing both power connection and data connection;

said physical connection means comprising a plug on a male connection means and a socket on a corresponding female connection means; wherein said logical connection means comprises a universal serial bus and said printer module and said at least one further module are stackable together in a series manner by connecting a male connection means on one said module to a female connection means on another said module.

BRIEF DESCRIPTION OF THE DRAWINGS

In order to assist with describing preferred embodiments of the invention, reference will be made to the following figures in which.

DETAILED DESCRIPTION OF THE DRAWINGS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Gender changing modules allow these single-connector modules to be connected at either end of a given compact printer configuration.

A 4 wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figures 4, 5, 6:
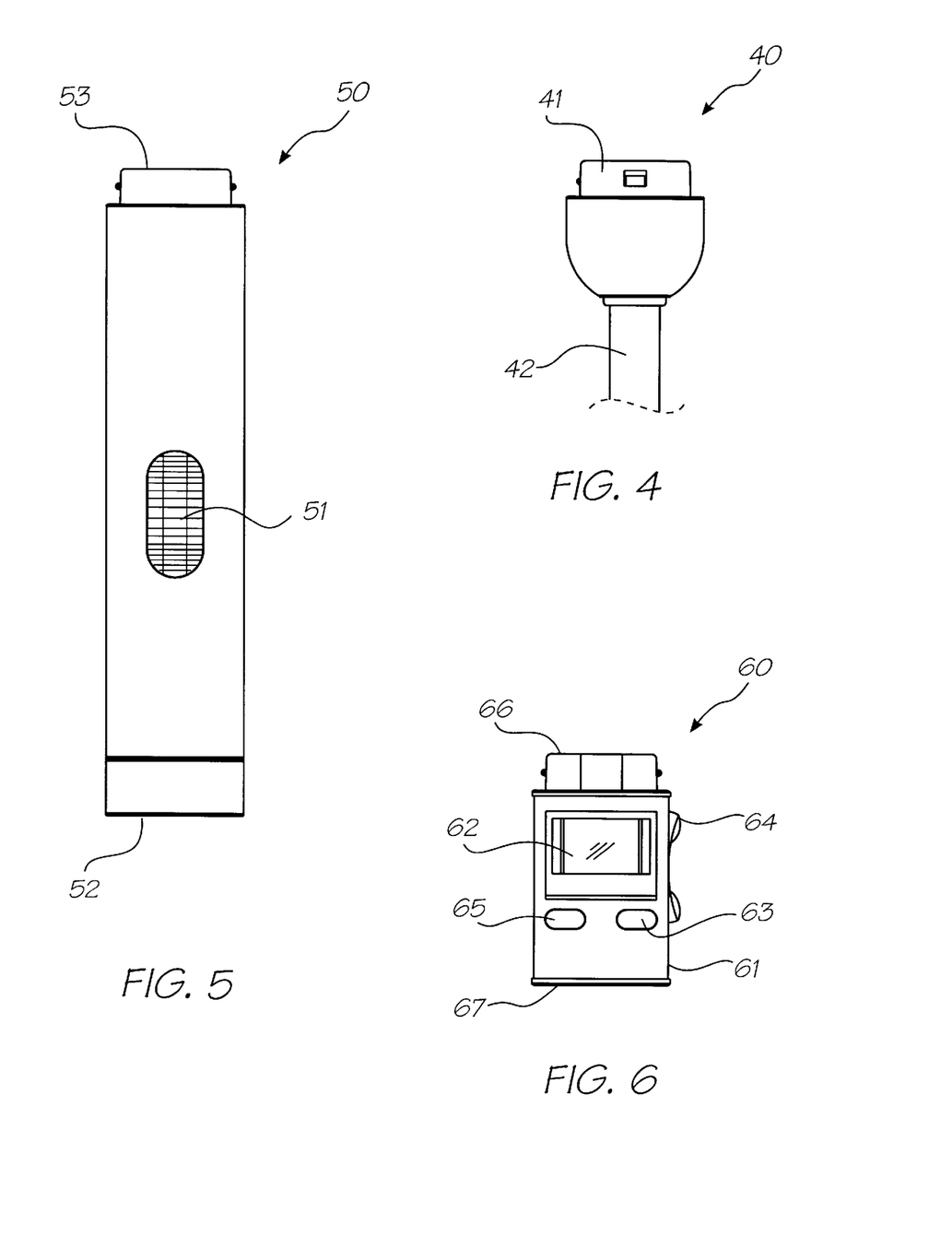
FIG. 4 is a communication module.
FIG. 5 is a flash module.
FIG. 6 is a timer module.
Figure 7:
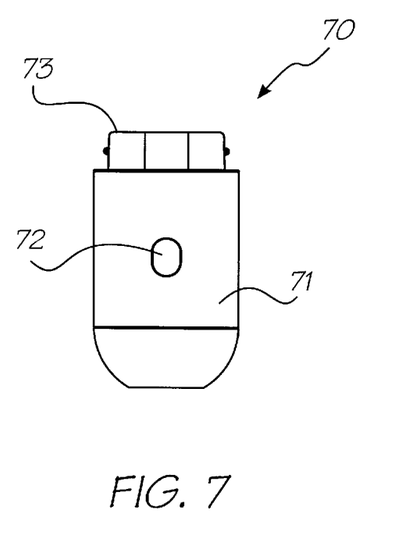
FIG. 7 is a laser module.

Compact printer modules can be grouped into three types:

image processing modules including a Printer Module, a Camera Module, and a Memory Module. Image processing modules are primarily what sets the compact printer system apart from other pen-like devices. Image processing modules capture, print, store or manipulate photographic images.

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
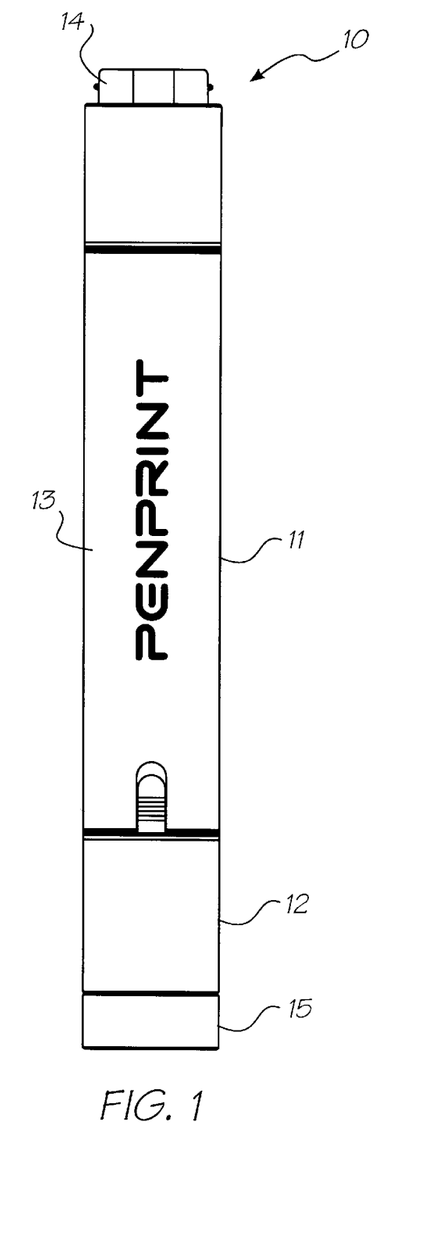
FIG. 1 is a printer module.

FIG. 1 shows a printer module that incorporates a compact printhead described in co-pending United States Patent Applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 $\mu$m in diameter, and spaced 15.875 $\mu$m apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

Figure 2:
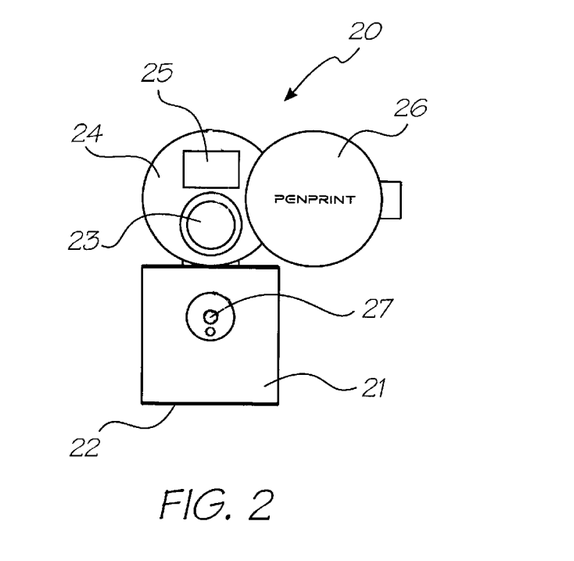
FIG. 2 is a camera module.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

Figure 3:
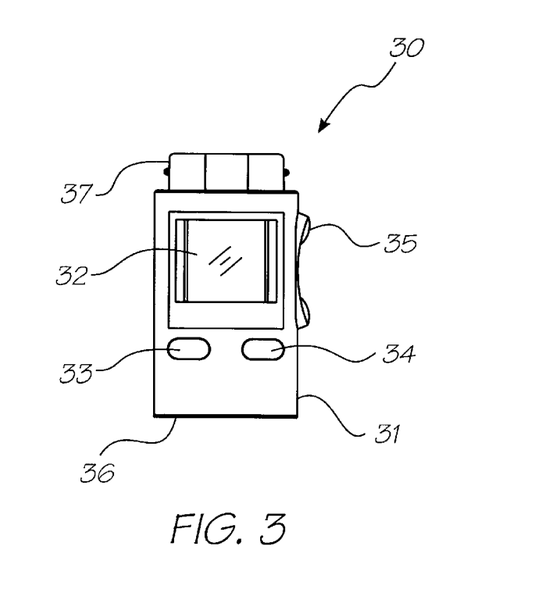
FIG. 3 is a memory module.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
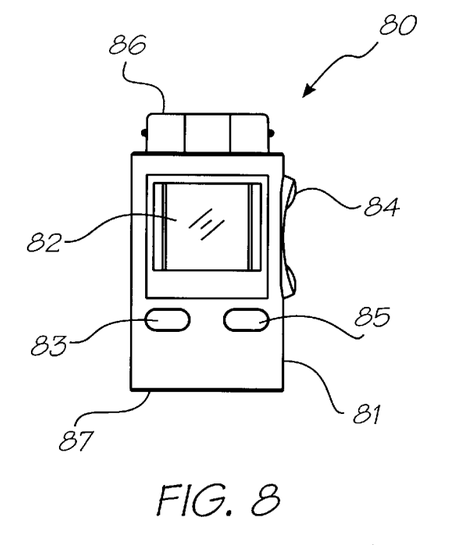
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
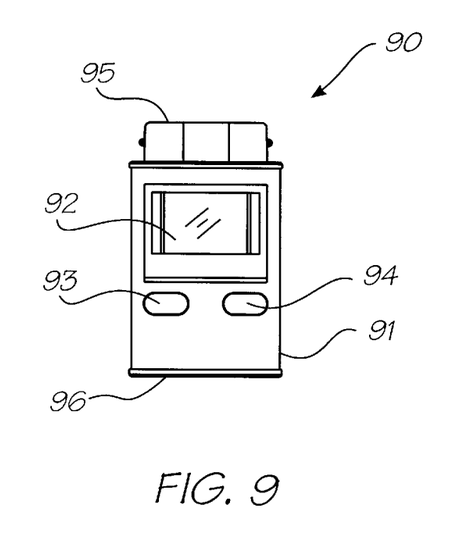
FIG. 9 is a character module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
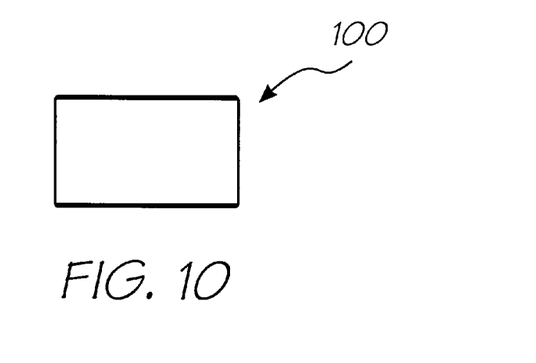
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
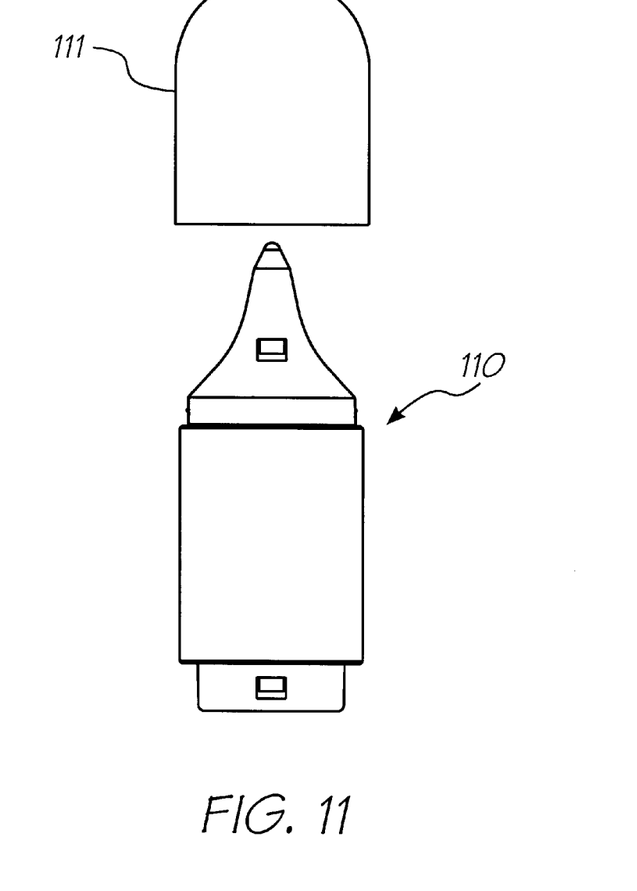
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
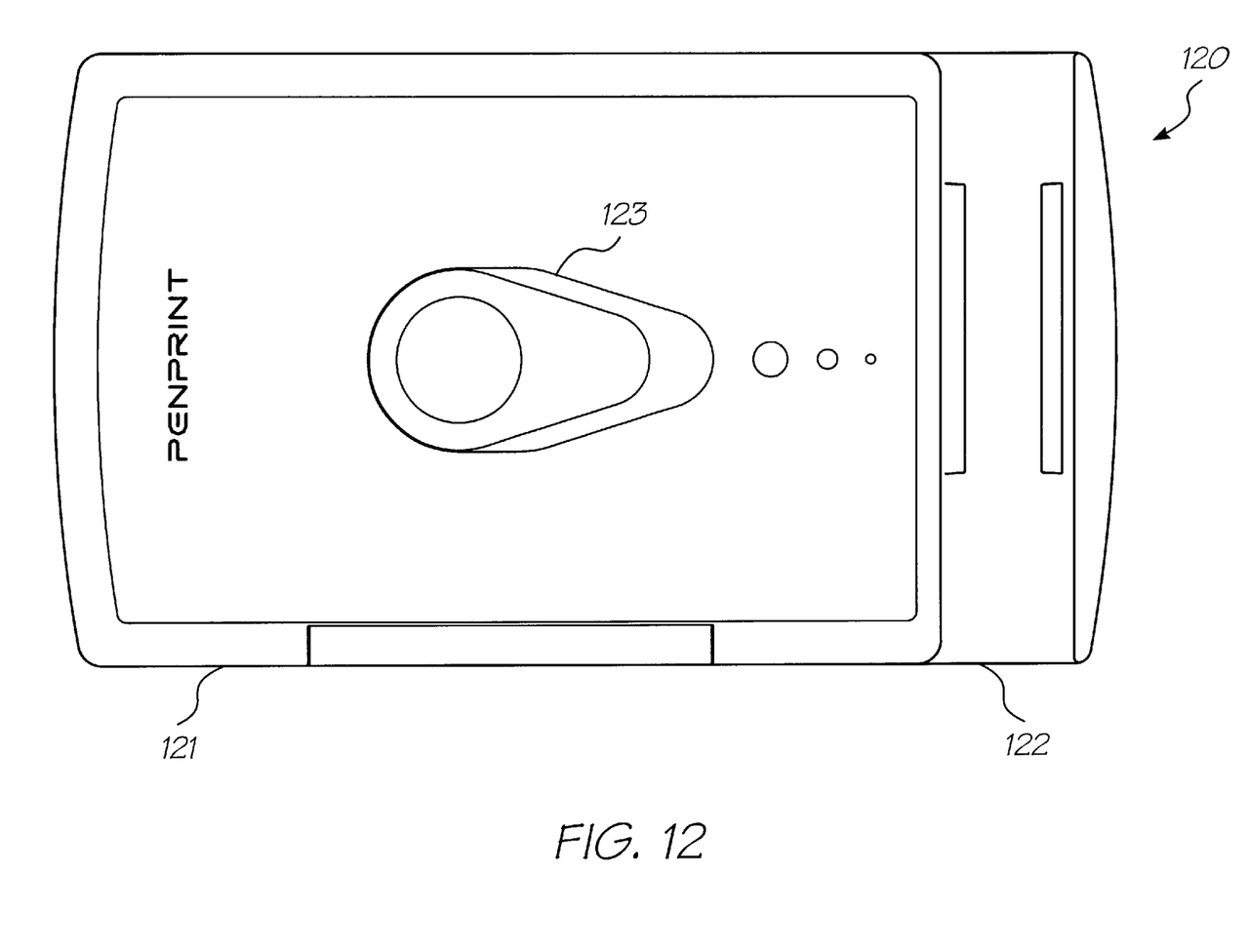
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module. The Printer Module holds a single photographic image that can be printed out via its Memjet printer. It also contains the 3V battery required to power the compact printer system.

Figure 13:
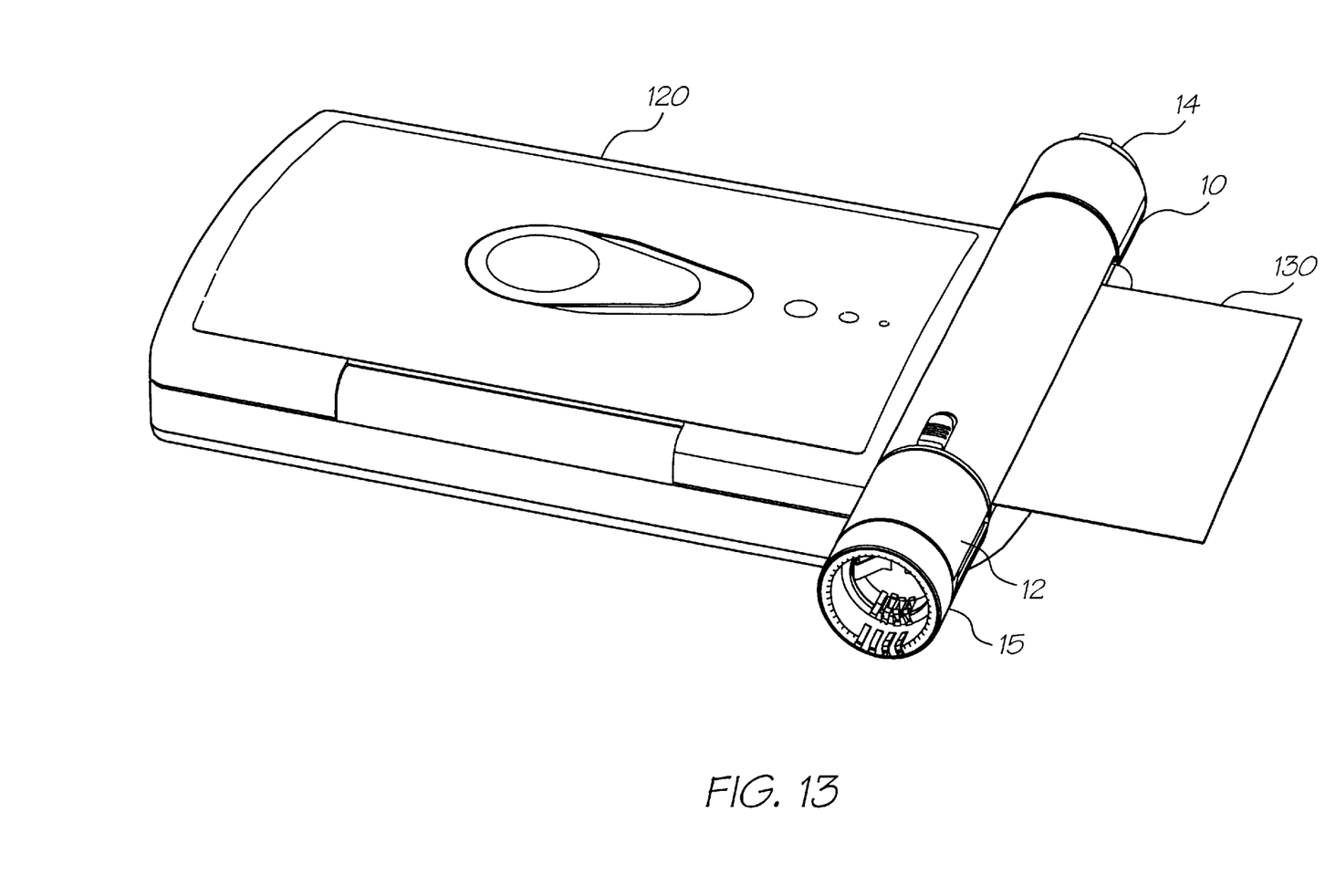
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
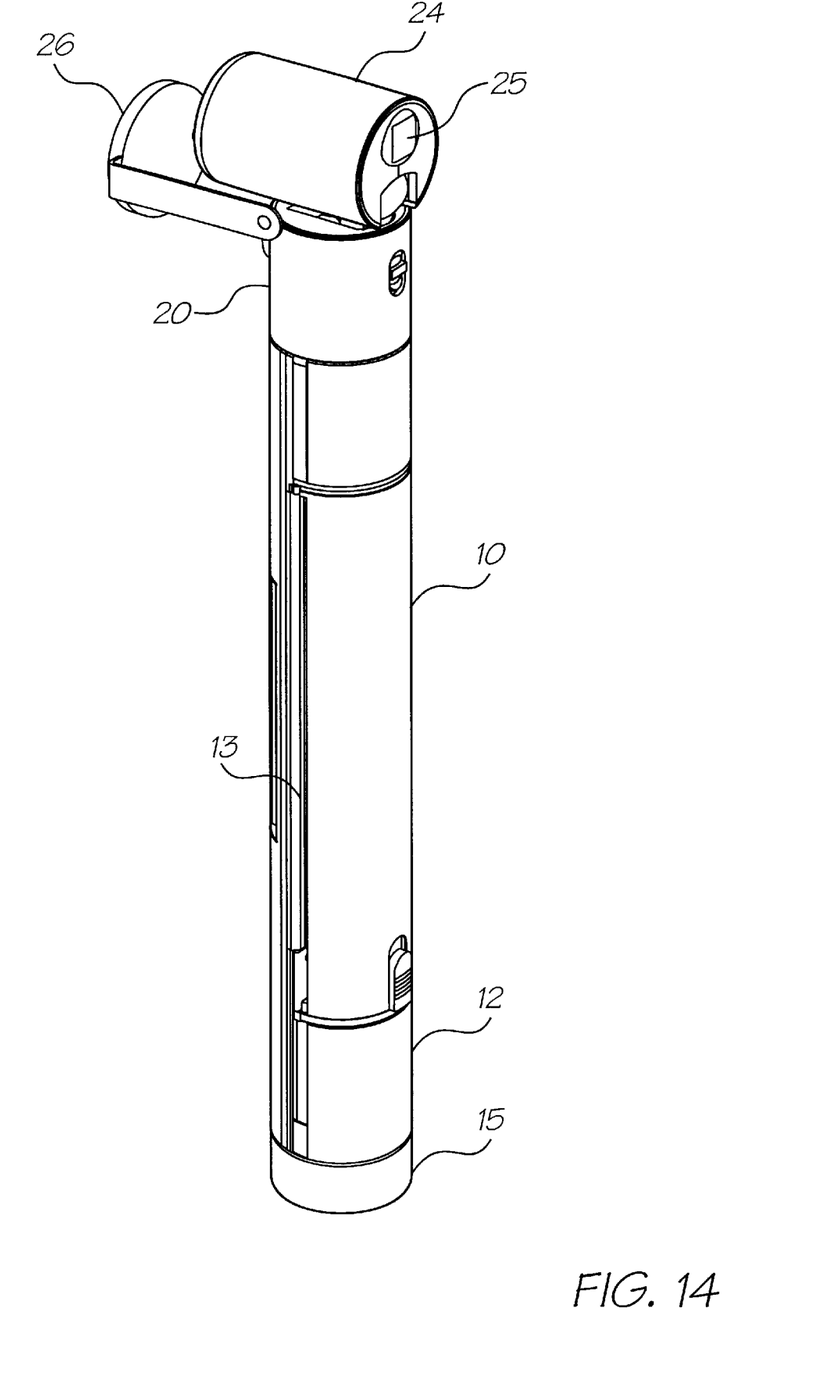
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
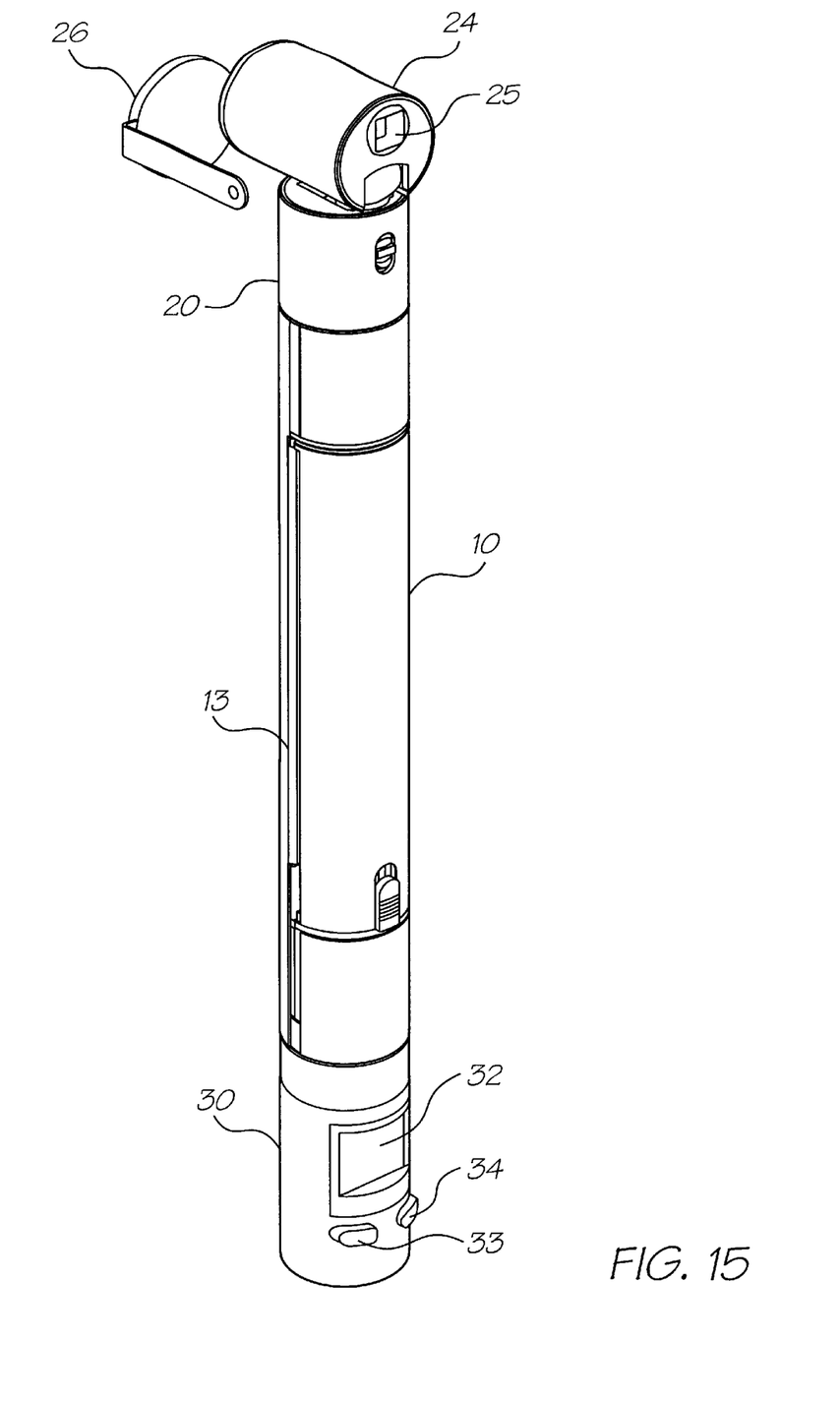
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
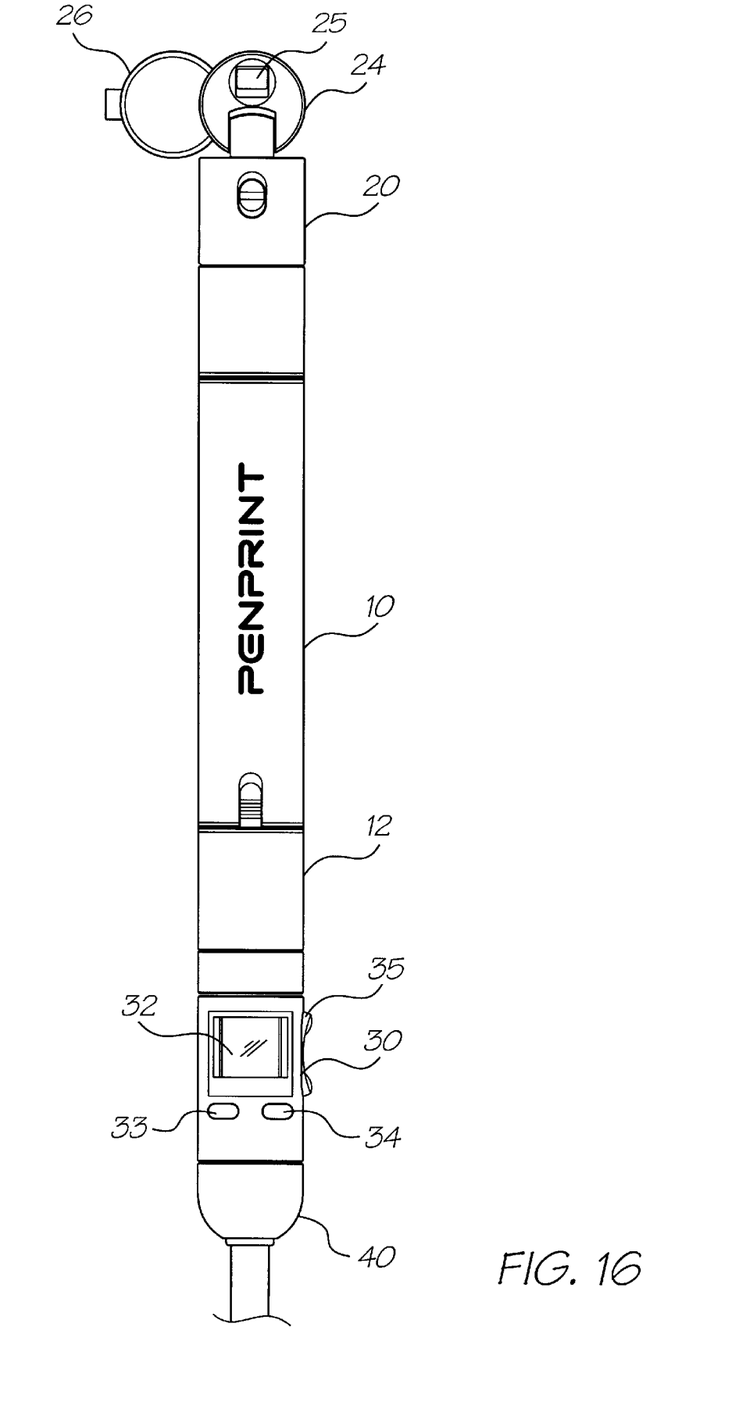
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
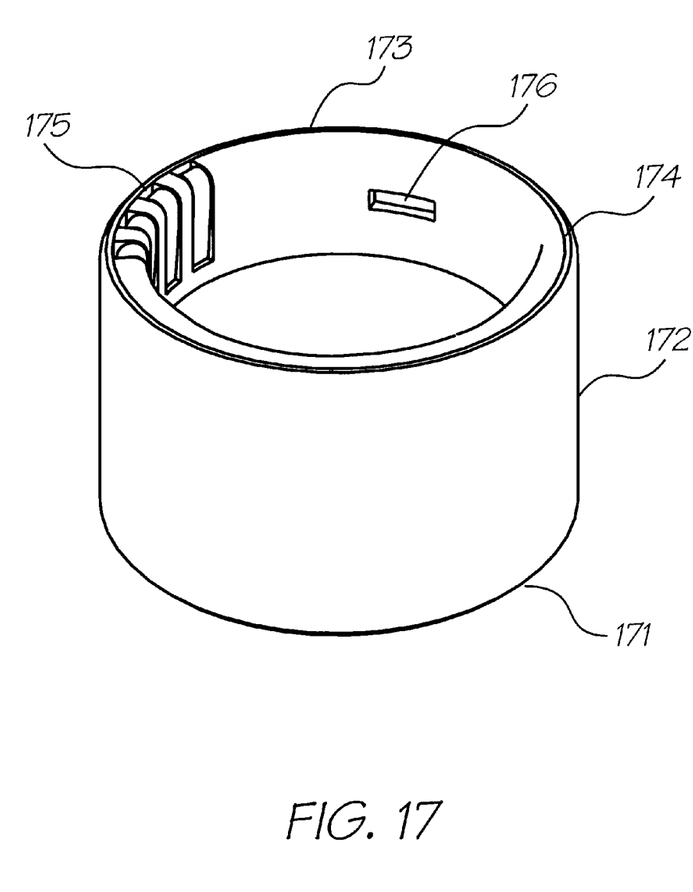
FIG. 17 shows a female connector as part of an adaptor module.

A compact printer configuration is constructed by physically connecting multiple compact printer modules together via the male/female bayonet connectors. A female connector 171 is shown in FIG. 17. The female connector 171 may be formed at one end of any of the modules defined above. FIG. 17 shows a female connector of an adaptor module. The connector consists of a body 172 that is an extension of the body of the module to which it is formed. The body 172 defines a socket 173 adapted to receive a male connector and having a notch 174 for alignment. Four metal contacts 175 provide power and data connection to other modules through the compact printer system serial bus. A recess 176 mates with a corresponding spring loaded catch on the male connector.

Figure 18:
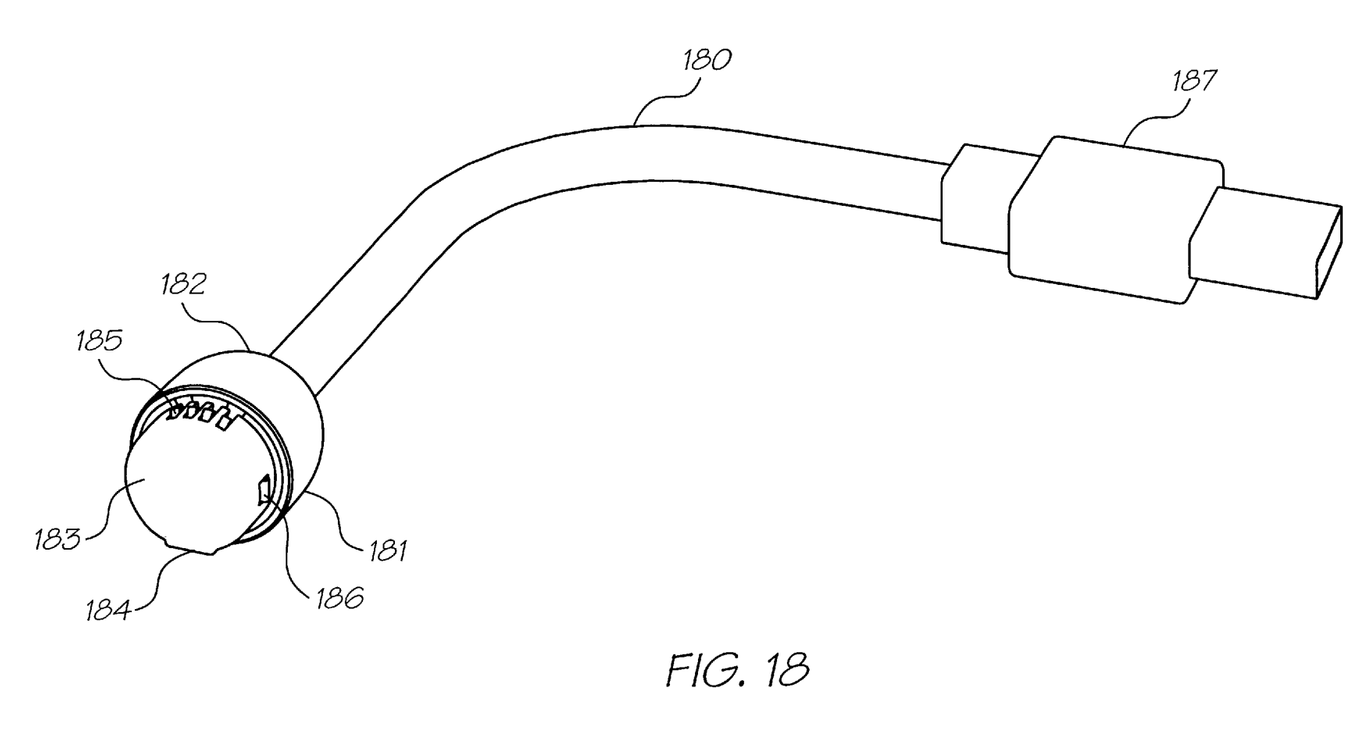
FIG. 18 shows a male connector as part of a communication module.

A communication module 180 is shown in FIG. 18 having a male connector 181 joined by a cable to a printer port plug 187. The male connector 181 comprises a body 182, which in other embodiments may be an extension of the body of any of the modules described above. A plug 183 is formed to match the socket 173 in the female connector. A ridge 184 fits the notch 174 to achieve correct alignment of the metal contacts 185 on the male connector with the metal contacts 175 on the female connector. A spring loaded catch 186 seats in the recess 176 to keep the female and male connectors together under moderate pressure.

The adaptor module 180 shown in FIG. 18 has a plug 187 specifically arranged for connection to the universal serial bus (USB) port of a personal computer. The USB protocol provides an appropriate protocol for the compact printer Serial Bus. An advantage of USB is that there is no specific "on/off" switch to take account of. The compact printer configuration runs in standby mode and allows hot attachment/detachment of modules.

A computer attached to the compact printer system via a USB Adaptor Module sees the various images on the compact printer device chain, and software (in the computer) allows images to be read from or written to the addresses within the compact printer devices.

In the logical interface, the Printer Module's current image does not have to be the source or destination of each image transfer. Instead, the computer system becomes the effective current image, reading images from any of the compact printer modules, and writing images to any of the compact printer modules.

The compact printer Serial Bus is the internal backbone bus for the compact printer system. It provides power for the compact printer modules, allows the various compact printer modules to communicate with each other, allows images to be transferred between them, and provides the means for growing /expanding the range of modules in the compact printer system.

The following features are required by the compact printer Serial Bus:

Reasonable Transfer Speed

Dynamic Attach/Detach

Auto Configuration

Expandability/Room for Growth

Low Cost

Low Power

The Universal Serial Bus (USB) specification caters for the requirements of the compact printer system. USB is well defined and is easily integrated into a hardware architecture.

The compact printer Serial Bus requires a medium speed for transferring images. While not the high speed required for video, a reasonable speed for image transmission is required. Although the maximum speed on USB is 12 MBits/sec, the maximum effective data transfer rate is 8 MBits/sec due to protocol overhead and transmission redundancy. The time taken to transmit a complete image (850× 534 $L^*a^*b^*$) is therefore 1.36 seconds (850×534×3×8/8,000,000).

Attachment or detachment of a module from the compact printer system does not adversely affect the module or the rest of the system. This is beneficial from an ease-of-use standpoint. Users of the compact printer can attach modules and detach modules to reconfigure the system. There is no need for individual on/off switches per module or special attachment procedures.

The compact printer modules are self identifying, and self configuring (including bus termination). Users do not need to know anything about the electrical system. Users may simply connect the appropriate modules together and the compact printer system configures itself appropriately.

Any given compact printer configuration consists of a number of compact printer modules connected to one another. The exact number of compact printer modules depends on the requirements of the user. In addition, the complete set of compact printer modules is not fixed. The compact printer serial bus allows new compact printer modules to be easily designed and added to the compact printer family. USB allows up to 127 physical devices to be connected at a given time (power requirements not withstanding). Since the devices are self identifying, new modules can be added to a compact printer system as long as they conform to the compact printer serial protocol.

The USB protocol is well-defined, this reduces design time, allows the use of pre-compiled cores, debugged protocols, and gives a large range of choice in terms of components. The choice of USB also allows the compact printer system to be easily integrated into a PC environment for image download and upload.

As described above, the printer module runs directly off an unregulated 3V power supply (a 3V battery). The compact printer Serial Bus also runs off this power. USB nominally runs at 5V. Under normal circumstances, voltage at a powered hub-port must be no less than 4.75Vdc, while voltage at a bus-powered hub must be no less than 4.40Vdc. However this is the case for a completely open system (which the compact printer system is not). Consequently the USB used within compact printer modules can be lower power, and therefore run off an unregulated 3V power supply. This is the only difference between regular USB and USB as used in compact printer.

Each compact printer module is visible on the compact printer Serial Bus. Each module is self identifying and self-configuring using standard USB protocols.

Apart from the standard protocol functions (including identification), there are a number of functions that each compact printer module is able of responding to. These are outlined in Table 1. Each module also has a number of module-specific functions.

TABLE 1

Basic compact printer Module Functions

| Name | Description |
|---|---|
| GetImageCounts( ) | Returns two counts - the number of images that can be read from the module, and the number of images that can be written to the module. This allows read only, write only, and virtual read only images. |
| GetCurrentImageNumber | If the module has a setting for the image number, this call returns the current image number. |
| GetImageAccessMethods | Returns two sets of 8 access bits. The first set represents the read access bits, and the second set represents the write access bits. See Table 2 for an interpretation of the bits. |
| GetImage(N, Mode) | Returns image number N using the specified 8-bit access mode. See Table 3 for an interpretation of the access mode bits. |
| StoreImage(N, Mode) | Stores an image at address N using the specified 8-bit access mode. See Table 3 for an interpretation of the access mode bits. |
| TransferImage(N1, Mode, Dest, N2) | Transfers the image at address N1 using the specified 8-bit access mode to the image at address N2 at the serial device with id Dest. See Table 3 for an interpretation of the access mode bits. |

The 8-bit mode returned by GetImageAccessMethods is interpreted as follows:

TABLE 2

8-bit return code from GetImageAccessMethods

| Bit | Interpretation |
|---|---|
| 0 | Access 850 × 534 permitted |
| 1 | Access 534 × 850 permitted |
| 2 | Interleaved $L^*a^*b^*$ permitted |
| 3 | Planar $L^*, a^*, b^*$ permitted |
| 4–7 | Reserved, and 0 |

The Printer Module is capable of all methods of image access and therefore returns 1s for bits 0–3. The 8-bit mode used for image read and write access via GetImage, StoreImage TransferImage is interpreted as follows:

TABLE 3

8-bit code used for read & write access

| Bit | Interpretation |
|---|---|
| 0 | Orientation: 0 = 850 × 534, 1 = 534 × 850 |
| 1 | 0 = interleaved, 1 = planar |
| 2–3 | Color plane (valid only when bit 1 = planar) 00 = L* 01 = a* 10 = 1,* 11 = reserved |
| 4–7 | Reserved, and 0 |

The USB Communication module of FIG. 18 is effectively a translator between standard USB cabling and the compact printer serial bus, with additional logic for translation of USB calls. An application specific integrated circuit (ASIC) in the body 182 provides the required translation. When connected, images can be transferred between the computer and the various modules of the compact printer system. The communication module allows captured images to be downloaded to the computer, and new images for printing to be uploaded into the compact printer.

The compact printer Communication Module has a physical mode of operation and a logical mode of operation.

The physical mode of operation is where the user simply plugs the Communication Module into a compact printer system, and the plug 187 into an appropriate computer communication port. There is no on/off switch on the compact printer Communication Module. The operating power is obtained from the computer's port power supply rather than the compact printer system power supply.

Once physically connected, the logical mode of operation comes into play. The ASIC in the compact printer Communication Module translates the compact printer modules into a virtual file system. Each compact printer module appears as a named sub-directory, each containing a set of numbered image files. When a specific file is read, the Communication Module translates the call into an image read command. When a specific file is written, the Communication Module translates the call into an image write command.

In addition, each module appears as its own device, which allows the writing of drivers specific to each module. This is because the compact printer Communication Module acts as a standard hub.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

What is claimed is:

1. A compact printer system comprising:
   a printer module having a full-width stationary printhead for printing a stored image on printable media in a single pass and having at least one first connection means;
   at least one further module, each having at least one second connection means connectable to said printer module;
   said first and second connection means including physical connection means and logical connection means providing both power connection and data connection;
   said physical connection means comprising a plug on a male connection means and a socket on a corresponding female connection means; wherein
   said logical connection means comprises a universal serial bus and said printer module and said at least one further module are stackable together in a series manner by connecting a male connection means on one said module to a female connection means on another said module.

2. The compact printer system of claim 1 wherein the physical connection means is a bayonet fitting comprising a ridge on one of said first or second connection means and a notch on another of said second or first connection means respectively, said ridge and notch corresponding for correct alignment of said one and another first and second connection means.

3. The compact printer system of claim 2 wherein the ridge is on the male connection means and the notch is on the female connection means.

4. The compact printer system of claim 1 wherein the physical connection means further comprises a spring loaded catch on one said first or second connection means and a recess on another of said second or first connection means respectively.

5. The compact printer system of claim 4 wherein the spring loaded catch is on the male connection means and the recess is on the female connection means.

6. The compact printer system of claim 1 wherein the logical connection comprises four metal tracks carrying power and data.

7. The compact printer system of claim 1 wherein said printer module has two first connection means and one or more of said further modules has two second connection means, one of said first and one of said second connection means being a male connection means and the other of said first and second connection means being a female connector.

8. The compact printer system of claim 1 wherein said first and second connection means allows dynamic attachment and detachment of modules.

9. The compact printer system of claim 1 wherein said further modules are selected from one or more of: a camera module; a flash module; a timer module; a memory module; an effects module; a character module; and a communications module.

10. The compact printer system of claim 1, wherein, said universal serial bus comprises:
    four conductive strips;
    a power source providing power on two of said strips;
    an integrated circuit connected to two of said conductive strips, said integrated circuit receiving data from said strips and transmitting data on said strips.

* * * * *